US008375251B2

(12) United States Patent
Ness et al.

(10) Patent No.: US 8,375,251 B2
(45) Date of Patent: Feb. 12, 2013

(54) MONITORING AND HEALING A COMPUTING SYSTEM

(75) Inventors: Andrew Lawrence Ness, Snohomish, WA (US); Brad Dean Thompson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 176 days.

(21) Appl. No.: 12/482,748

(22) Filed: Jun. 11, 2009

(65) Prior Publication Data

US 2010/0318836 A1  Dec. 16, 2010

(51) Int. Cl.
*G06F 11/00* (2006.01)
(52) U.S. Cl. ......................................... 714/26
(58) Field of Classification Search .................. 714/26
See application file for complete search history.

(56) References Cited

U.S. PATENT DOCUMENTS

| 6,718,489 | B1 * | 4/2004 | Lee et al. .................. 714/43 |
| 7,010,718 | B2 * | 3/2006 | Ogawa et al. .................. 714/4 |
| 7,206,836 | B2 | 4/2007 | Dinker |
| 2004/0193476 | A1 | 9/2004 | Aerdts |
| 2006/0107087 | A1 | 5/2006 | Sieroka |
| 2009/0157627 | A1 * | 6/2009 | Arthursson .................. 707/3 |

OTHER PUBLICATIONS

Rimma V. Nehme, "Database, Heal Thyself," ICDE Workshop 2008, authorized licensed use limited to IEEE Xplore, downloaded on Apr. 29, 2009 at 02:33 from IEEE xplore, Restrictions apply. 7pp, http://ieeexplore.ieee.org/stamp/stamp.jsp?arnumber=04498278.
Javier Alonso, Jordi Torres, Technical University of Catalonia, Barcelona Supercomputing Center, Barcelona, Spain, Rean Griffith, Gail Kaiser, Department of Computer Science, Columbia University, New York, NY, USA, Luis Moura Silva, University of Coimbra, CISUC, Portugal, "Towards Self-Adaptable Monitoring Framework for Self-Healing," 9 pp, Jun. 5, 2009, http://www.springerlink.com/content/k8515065q453w2p7/.
University of Helsinki "Using Nagios to Monitor Faults in a Self-Healing Environment," 2 pp, Apr. 30, 2009, http://www.zdnet.com.au/whitepaper/0,2000063328,22448750p-16001403q,00.htm.
Sun Microsystems, Inc., SAS Enterprise Intelligence Platform Powered by Sun's Datacenter of the Future, White Paper, Nov. 2007, 33 pp, http://se.sun.com/promotions/sas/DCoF-WP.pdf.
Microsoft Corporation, WindowsServer 2008 Comparison of Windows Server 2003 and Windows Server 2008, published: Jan. 2008, 107 pp., http://download.microsoft.com/download/7/8/d/78d2768f-640a-4e14-a3f8-10835afb0533/Windows%20Server%202008%20and%20Windows%20Server%202003%20Comparison%20-%20Final.docx.
Alorie Gilbert, Staff Writer, CNET News, "IBM Introduces Self-Healing Data Center Software," Dec. 2, 2005, 2 pp, http://news.cnet.com/IBM-introduces-self-healing-data-center-software/2100-1012_3-5979193.html.

* cited by examiner

*Primary Examiner* — Amine Riad
(74) *Attorney, Agent, or Firm* — Shook Hardy & Bacon L.L.P.

(57) ABSTRACT

A method, system, and media for monitoring and healing a computing system. Monitoring agents are deployed to a computing system to be monitored. The monitoring agents collect performance and non-performance counter data of computing devices in the computing system. The data include any recordable information about the monitored computing system. The data is stored in a performance database. A master controller monitors the data for an occurrence of an alert condition that indicates degradation in the health of the computing system. The health of the computing system includes the health of the system, individual components therein, and interactions with other systems. The master controller performs a resolution process to resolve issues causing degradation of the computing system. The collection of data and the monitoring thereof is customizable for an individual computing device, for a cluster of computing devices, or for the computing system as a whole.

18 Claims, 5 Drawing Sheets

MONITORING AND HEALING A COMPUTING SYSTEM

BACKGROUND

Modern computer networks include various computing devices such as servers and data centers for exchanging data over the network. The networks may have as many as hundreds or even thousands of such computing devices connected thereto. Issues or problems arise in the operations of these computing devices from time to time that affect the operability of the computing devices to fulfill their intended purpose. The issues include problems such as insufficient memory, errors in processing or execution of commands, and processing bottlenecks, among a variety of others.

On the large scale seen in many of today's computer networks, a very large number of human administrative personnel are necessary to identify and resolve the issues and problems that arise in a computer network.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In embodiments of the invention media, systems, and computer-implemented methods for monitoring and healing a computing system are described. Performance counter and non-performance counter data for computing systems are identified by an administrator for which data elements are collected and monitored. Alert conditions that indicate values of the data elements for which a restorative action is necessary are also identified by an administrator. A monitoring agent collects the data element values and stores the values in a performance database. A master controller monitors the data element values to identify occurrences of the alert conditions. The master controller identifies an appropriate restorative action and executes the restorative action. The collection of data elements and the restorative actions are extensible to any desired data elements and any desired restorative actions.

BRIEF DESCRIPTION OF THE DRAWINGS

Illustrative embodiments of the invention are described in detail below with reference to the attached drawing figures, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the invention include systems, computer-readable media, and methods for monitoring and healing a computing system. The health of a computing system can be described as a measure of a computing system's current functioning with respect to an optimal functioning level of the computing system or as an amount of usage of the total available resources of the computing system. Healing of the computing system includes actions or processes taken by the computing system, a second computing system, or an administrator to improve the health of the computing system. Further, self-healing may be described as identifying issues, problems, or errors that have occurred in the past, are occurring presently, or that may occur in the future, and automatically identifying and performing a resolution process to correct or prevent the issues and thus, heal the computing system.

In a first embodiment, a system for monitoring and healing a computing system is described. The system includes a monitoring agent, a performance database, a master controller, and a configuration database. The monitoring agent utilizes a first computer process to collect non-performance counter data elements from a first computing device indicative of the health of a computing system. The performance database stores the non-performance counter data elements from the first computing device. The configuration database stores instructions that are executable by a second computing process to resolve an alert condition when the non-performance counter data elements exhibit a predefined characteristic that indicates a degradation in the health of the computing system. The master controller utilizes the second computer process to monitor the non-performance counter data elements stored in the performance database to identify an occurrence of the alert condition, obtain the instructions from the configuration database to resolve the alert condition when the alert condition is identified, and execute the instructions to resolve the alert condition. The first and second computer processes are performed utilizing computing devices.

In another embodiment, computer-readable media having computer-executable instructions embodied thereon that, when executed, perform a method for monitoring and healing a computing system is described. Data elements for performance counter and non-performance counter data are collected from a first computing system. The data elements are indicative of the health of the first computing system. The data elements are monitored via a second computing system for an alert condition. The alert condition is a pre-defined status of the first computing system that is indicated by the data elements. An occurrence of the alert condition is identified based on the non-performance counter data elements. A resolution process is identified that includes steps to be performed by the second computing system to resolve the alert condition. The resolution process is performed to resolve the alert condition.

In another embodiment, a computer-implemented method for automatically monitoring and healing a server computing system is described. An identification of performance counter and non-performance counter data of a first computing device indicative of the health of a computing system is received. The non-performance counter data elements include a service status, a database query, and a ping. The performance counter and non-performance counter data elements are collected from the first computing device via a second computing device. An alert condition definition that identifies a data element or group of data elements of the performance counter and non-performance counter data elements indicative of deteriorating health of a computing system is received. A resolution process that is executable by the second computing device to resolve an alert condition is received. The resolution process includes a decision tree that is followed by the second computing device to execute the resolution process. The second computing device monitors the performance counter and non-performance counter data elements collected from the first computing device based on the alert condition definition. The second computing device identifies deteriorating health of the computing system based on the alert condition definition. The second computing device executes the resolution process to resolve the issue that is a cause of the deteriorating health of the computing system. When the resolution process is unable to resolve the issue that is a cause of the deteriorating health of the computing system, additional processes are added to the resolution process during runtime or processes of the resolution process are changed during runtime, such that the resolution process is useable to automatically resolve subsequent occurrences of the issue.

Figure 1:
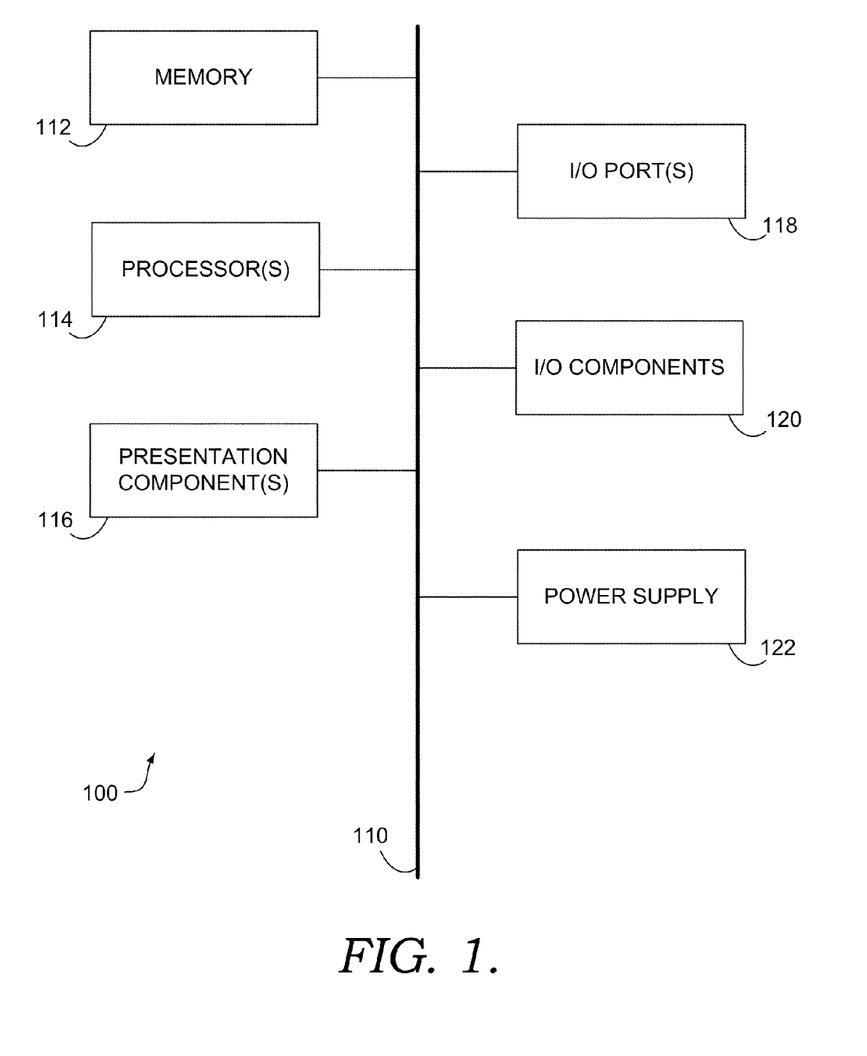
FIG. 1 is a block diagram depicting an exemplary computing device in accordance with an embodiment of the invention.

Referring now to the drawings in general and initially to FIG. 1 in particular, a computing device 100 is described in accordance with embodiments of the invention. The computing device 100 is but one example of a suitable computing device and is not intended to suggest any limitation as to the scope of use or functionality of invention embodiments. Neither should the computing device 100 be interpreted as having any dependency or requirement relating to any one or combination of components illustrated.

Embodiments of the invention may be described in the context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, specialty computing devices, etc. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, input/output (I/O) components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; compact disc read-only memory (CD-ROM), digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

The memory 112 includes computer-storage media in the form of volatile and/or nonvolatile memory. The memory 112 may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
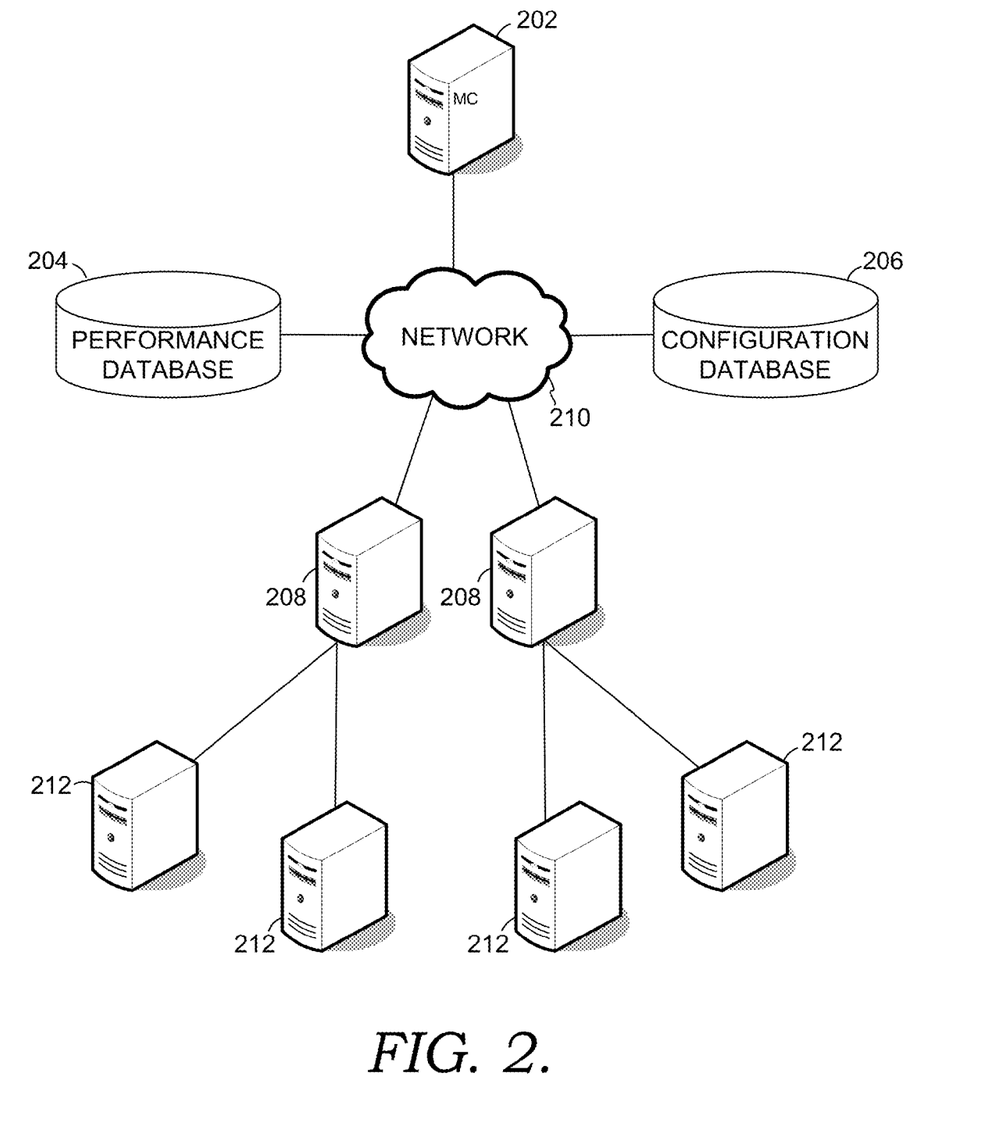
FIG. 2 is a block diagram depicting an exemplary network configuration in accordance with an embodiment of the invention.

With reference now to FIG. 2, a block diagram depicting an exemplary network configuration 200 in accordance with an embodiment of the invention is described. The exemplary network configuration 200 includes a first computing device 202, a performance database 204, a configuration database 206 and one or more second computing devices 208. The first computing device 202 is any computing device as described above with respect to FIG. 1 and computing device 100. In an embodiment, more than one first computing device 202 is provided for failover service, such that if the first computing device 202 encounters hardware or software issues a backup first computing device 202 takes over the functions of the problem first computing device 202 and ensures continuity of service.

The performance database 204 includes any database, data structure, or memory suitable for use in receiving, storing, and providing access to data elements stored therein. The performance database 204 may be a component of a system separate from the first computing device 202 or may be an integrated component of the first computing device 202.

Like the performance database 204, the configuration database 206 includes any database, data structure, or memory suitable for use in receiving, storing, and providing access to configuration files stored therein. The configuration database 206 may be a component of a system separate from the first computing device 202 or may be an integrated component of the first computing device 202.

The second computing devices 208 comprise any computing device 100 as described above with respect to FIG. 1. In an embodiment, the second computing device 208 is a server computer. In an embodiment, a plurality of second computing devices 208 are included in a network configuration.

The first computing device 202, the performance database 204, the configuration database 206, and the second computing device(s) 208 are connected via a network 210. In an embodiment, one or more of the first computing device 202, the performance database 204, the configuration database 206, and the second computing device(s) 208 are directly coupled or are integrated in a single computing system. The network 210 is any network, intranet, ethernet, the Internet, or other communication network that provides and facilitates communication between one or more of the first computing device 202, the performance database 204, the configuration database 206, and the second computing device(s) 208. The network 210 includes any necessary hardware or software components necessary to facilitate such communications, but such are not illustrated here for simplicity.

One or more third computing devices 212 may be included in the exemplary network configuration 200. The third computing devices 212 comprise any computing device, such as the computing device 100 described above with respect to FIG. 1. The third computing devices 212 are in communication with the second computing device 208 via a direct physical connection or through a network (not shown) such as network 210. In an embodiment, the third computing devices 212 are connected to the network 210. In another embodiment the third computing devices 212 are front end server computers that are directly accessed by users.

It is understood that various arrangements of the exemplary network configuration 200 described above are possible without departing from the scope of the invention and without affecting the functionality of the components of the exemplary network configuration 200. All such arrangements are understood as disclosed herein.

Figure 3:
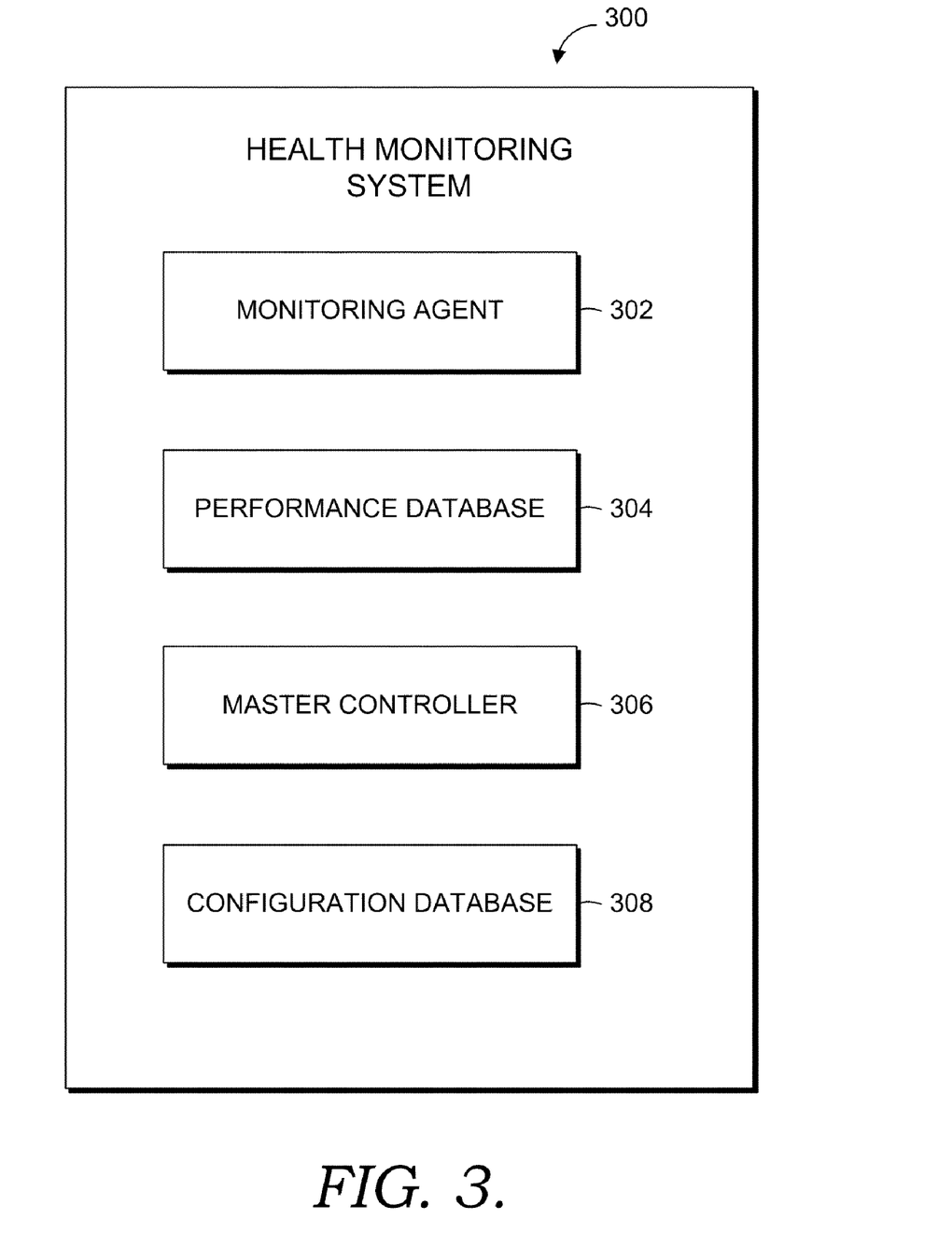
FIG. 3 is a block diagram depicting a system for monitoring and healing a computing system in accordance with an embodiment of the invention.

With additional reference now to FIG. 3, a block diagram depicting a system 300 for monitoring and healing a computing system in accordance with an embodiment of the invention is described. The system 300 includes a monitoring agent 302, a performance database 304, a master controller 306, and a configuration database 308. The monitoring agent 302 includes a service or application that operates at a second computing device, such as second computing device 208. The monitoring agent 302 collects data elements that are descriptive of performance counter and non-performance counter data of the second computing device and reports the data elements to the performance database 304 (described below) for storage. The data elements include any piece of recordable information about the second computing device such as performance counter data and non-performance counter data.

Performance counter data includes data that is indicative of memory usage, processing latency, processor usage, data transfer rates, and data request rates, among other data related to the performance of a computing device. In an embodiment, performance counter data includes central processing unit (CPU) time, structured query language (SQL) user connections, SQL batch requests per second, and transmission control protocol (TCP) v6.

Non-performance counter data includes for example, but not limitation, service status, event log information, status codes, space available in a database, mirroring status, return values from a database query, and the existence of a given file in a given directory, among others. In an embodiment, non-performance counter data includes service statuses such as that of an SQL service (for example Microsoft® SQL server (MSSQLSERVER) and SQL server agent (SQLSERVER-AGENT) from the Microsoft Coproration® of Redmond, Wash.) or of a computer browser, a database non-suspect mode, a ping of an Internet Protocol (IP) address, and a ping of an SQL database.

An administrator identifies the performance counter and non-performance counter data to be monitored, the data elements to be collected, and the frequency by which the data elements are to be collected. In an embodiment, monitoring agent 302 and/or the master controller 306 (described below) determine one or more of the data elements to be collected and the frequency thereof. The monitoring agent 302 obtains instructions for monitoring from the configuration database 308 (described below).

In an embodiment, a plurality of second computing devices are included in a network, such as network 210 as depicted in FIG. 2, and a monitoring agent 302 is deployed on each of the plurality of second computing devices. As such, each monitoring agent 302 collects data elements on performance counter and non-performance counter data of a respective second computing device and reports the data elements to the performance database 304 for storage. Further, each monitoring agent 302 is independently configurable to allow the data elements collected and performance counter and non-performance counter data monitored to be tailored for each respective second computing device. Thus, differences in software, hardware, or other components of each second computing device can be accounted for by tailoring each respective monitoring agent 302 with respect to its respective second computing device. The monitoring agent 302 may also be configured to monitor more than one second computing device.

In another embodiment, the monitoring agent 302 is deployed on a second computing device, such as the second computing device 208, but is tasked with monitoring one or more third computing devices, such as the third computing devices 212 as depicted in FIG. 2. A plurality monitoring agents 302 may be deployed on the second computing device to monitor an equal plurality of third computing devices or a single monitoring agent 302 may monitor multiple third computing devices. As such, issues affecting a third computing device will not affect the operability of the monitoring agent 302 monitoring the third computing device. In another embodiment, a monitoring agent 302 is deployed on both a second and a third computing device and both monitoring agents 302 monitor the third computing device. As such, redundancy and failover protection is built in to the monitoring system. Further, extrapolations, arrangements and redundancy of monitoring agents 302 monitoring second, third, and subsequent computing devices is contemplated and is understood as disclosed herein.

The performance database 304 receives and stores the data elements collected by the monitoring agent 302. The performance database 304 is also accessible by the master controller 306 (described below) to allow the master controller 306 to obtain one or more of the data elements stored therein. The performance database 304 includes any suitable database, data structure, or memory as described above with respect to the performance database 204. Further, in an embodiment, one or more redundant performance databases are employed as failover for the performance database 304 and the performance database 304 is monitored by a monitoring agent 302 to ensure the health of the performance database 304.

The master controller 306 is a service or application that is deployed on a first computing device, such as the first computing device 202. The master controller 306 functions to monitor the data elements collected by the monitoring agent 302 and stored in the performance database 304. The master controller 306 monitors the data elements for an alert condition which is defined as one or more pre-determined values, trends, sets of values, or other feature of the data elements that indicates degradation in the health of the second computing device being monitored by the monitoring agent 302. In an embodiment, alert conditions include usage of more than 90% of a CPU's processing capability, stoppage of an SQL server service or agent, usage of more than 80% of an available memory or database space, operation of a database in a suspect mode, non-receipt of data elements for a period of time, and failure of a ping communication.

Features of the data elements may include outlier or anomaly data points that indicate a data element for a performance counter and/or non-performance counter data is outside normal or expected bounds, and groups of data elements that indicate a known issue, among others. The master controller 306 may also employ calculations performed on the data elements to provide additional issue identification mechanisms. Additionally, the data elements can be aggregated, truncated, or removed in order to provide the most relevant data elements for consideration and to increase efficiency of analysis and storage of the data elements (e.g., unnecessary data elements are removed to make calculations more streamlined and to avoid unnecessarily using memory space). Further, the degradation of the health of the second computing device indicated by the data elements may be a result of past events, currently occurring events, or even degradation that is indicated to have a probability of occurring in the future.

The master controller 306 also accesses the configuration database 308 to identify and obtain a resolution process for resolving an issue or problem causing the alert condition and performs the process to resolve the issue or repair the problem. The resolution process includes any available task or process useable to resolve the issue affecting the health of the second computing device. Such processes include for example, and not limitation, restarting a service, restarting a computing device, running additional applications or services, running script, querying a database, querying an application, taking the second computing device offline, and transferring operations to another computing device, among a variety of others.

The resolution processes are developed by an administrator and can be tailored to individual specific situations or to resolve a broader array of issues. Further, the resolution process may include a decision tree or process flow by which the master controller 306 resolves a given issue. As such, the resolution process and decision tree can provide an array of processes by which the master controller 306 attempts to resolve an issue or problem from the most basic processes to more complex or issue specific processes.

In an embodiment, the master controller 306 also provides an indication to an administrator that an alert condition has been identified. The indication may also include any contextual information regarding the alert condition and any resolution processes that were completed to heal the issues causing the alert condition. The indication may be communicated and/or displayed as an entry in a log file or database or may be provided by any other available means.

The configuration database 308 receives, stores, and provides access to configuration information defined by an administrator for use by the monitoring agent 302 and the master controller 306. The configuration database 308 is any suitable database, data structure, or memory as described above for configuration database 206. Further, in an embodiment, one or more redundant configuration databases are employed as failover for the configuration database 308 and the configuration database 308 is monitored by a monitoring agent 302 to ensure the health of the configuration database 308.

The configuration database 308 includes configuration information that identifies performance counter and non-performance counter data of a given second, third, or subsequent computing device to be monitored, data elements to be collected, and frequencies for the collection for use by the monitoring agent 302. Configuration information that includes features of the data elements and performance counter and non-performance counter data that identify an alert condition for which the master controller 306 monitors is also included in the configuration database 308. Additionally, the configuration database 308 stores the resolution processes that are retrieved by the master controller 306 upon identifying an occurrence of an alert condition.

Embodiments of the invention employ a group of distributed components to provide monitoring and healing of computing devices. Distribution of the components provides failover protection and may provide redundancy of monitoring to ensure continuity of service when the health of a given system is degraded. Distribution also allows monitoring and healing to be highly scalable and extensible to a large number of computing devices of varied hardware and software configurations. In an embodiment one or more of the components may be integrated or executed at a single computing device.

In an embodiment, in operation of system 300 an administrator initially deploys the monitoring agent(s) 302 to the second computing devices to be monitored. The administrator also provides identification of data elements for performance counter and non-performance counter data to be monitored and collected from the second computing devices as well as the frequency of the collections, such as for example and not limitation those depicted in Table 1, below. The administrator may also define how the data elements are to be stored in the performance database, e.g. whether the data elements are to be aggregated, stored indefinitely, or otherwise manipulated. These identifications and definitions are stored as configuration files in the configuration database 308. The monitoring agent(s) 302 retrieves the administrator's identifications from the configuration database 308, collects the appropriate data elements at the desired frequencies, and stores the data elements in the performance database 304.

TABLE 1

Data Element Collection

| Data | Data Element Type | Frequency of Collection | Aggregation |
|---|---|---|---|
| CPU Time | Performance Counter | Every 60 seconds | Over 5 minutes |
| SQL User Connections | Performance Counter | Every 60 seconds | None |

TABLE 1-continued

Data Element Collection

| Data | Data Element Type | Frequency of Collection | Aggregation |
|---|---|---|---|
| SQL Batch Requests/second | Performance Counter | Every 60 seconds | None |
| TCPv6 | Performance Counter | Every 60 seconds | None |
| SQL Service MSSQLSERVER | Service Status | Every 120 seconds | None |
| SQL Service SQLSERVERAGENT | Service Status | Every 120 seconds | None |
| Service ComputerBrowser | Service Status | Every 300 seconds | None |
| Database Non-Suspect Mode | Database Query | Every 10 seconds | None |
| Ping IP | Ping | Every 30 seconds | None |
| Ping SQL | Ping | Every 30 seconds | None |
| Replication Latency | Replication Latency | Every 60 seconds | None |

The administrator also provides alert conditions and resolution processes that are also stored in the configuration database 308 as configuration files. The resolution processes correspond with one or more alert conditions such that an occurrence of a given alert condition indicates a respective resolution process to be performed. The master controller 306 obtains the configuration files from the configuration database and monitors the data elements in the performance database 304 for occurrences of alert conditions. Upon identification of an occurrence of an alert condition the master controller 306 obtains a corresponding resolution process from the configuration database 308 and attempts to resolve the issue causing the alert condition.

During runtime the administrator may make adjustments or changes to the performance counter and non-performance counter data, data elements to be collected, frequency of collections, alert condition definitions, and resolution processes. The administrator provides the changes which are communicated to the configuration database 308 and are then communicated to the monitoring agent(s) 302 or master controller 306 as necessary. In an embodiment, the changes and the initial identifications and definitions are communicated to the configuration database 308 as an extensible markup language (XML) file. In another embodiment, the changes are communicated to the configuration database 308 and the monitoring agent(s) 302 and master controller 306 are notified that the changes are available. The monitoring agent(s) 302 and master controller 306 then access the configuration database 308 to obtain the changes.

In another embodiment, the alert conditions also identify data elements that indicate that an issue may occur in the future. As such, the master controller 306 obtains a preventative action process from the configuration database 308 and performs one or more preventative actions to prevent an issue from occurring on a respective computing device.

Additionally, in embodiments, a user interface and oversight application is provided to the administrator for administering the system 300. Thereby, the administrator provides all necessary information and changes thereto for monitoring and healing the associated computing devices. An administrator can tailor each monitored computing device individually or can indicate groups of computing devices to be monitored similarly. The administrator might also indicate one or more monitoring rules by which the master controller or another component determines a desired monitoring setup based on one or more performance counter and non-performance counter data of the monitored computing devices.

Further, the administrator selects specific data elements to be collected and monitored or the administrator may select performance counter and non-performance counter data to be monitored and the master controller or another component selects one or more appropriate data elements to be collected to allow monitoring of the selected performance counter and non-performance counter data.

As such, the system 200 provides highly extensible and highly scalable monitoring and healing of computing devices on a network. By providing monitoring, automatic identification of alert conditions, and automatic performance of resolution processes the system 200 provides lights out administration of the computing devices on the network (e.g., requires very little, or no interaction from an administrator).

Figure 4:
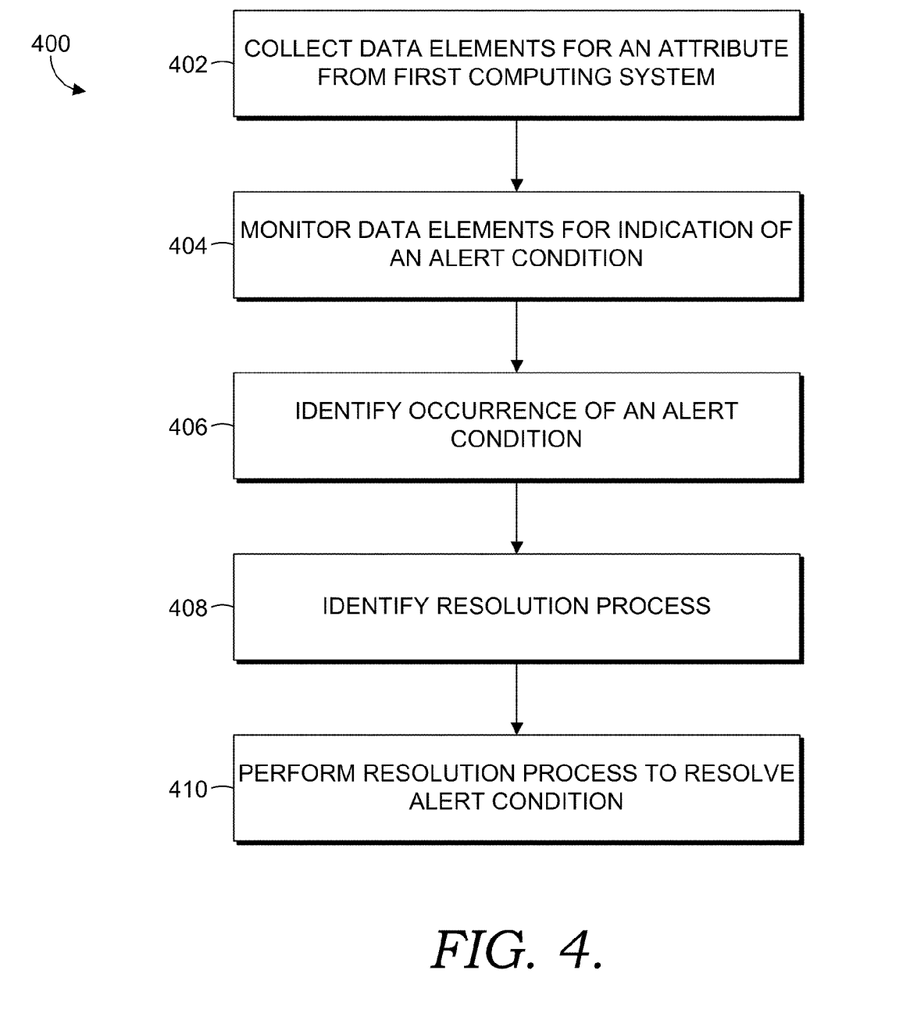
FIG. 4 is a flow diagram depicting a method for monitoring and healing a computing system in accordance with an embodiment of the invention.

With reference now to FIG. 4, a flow diagram depicting a method 400 for monitoring and healing a computing system in accordance with an embodiment of the invention is described. Data elements that are descriptive of performance counter and non-performance counter data of a first computing system are collected, as indicated at 402. In an embodiment, the data elements are collected by a monitoring agent as described above. The data elements are further indicative of the health of the first computing system. The health of the first computing system includes not only the performance of computing devices therein with respect to an optimal performance, but may also include the health of a database, an application, a memory, a software component, and/or a hardware component of the first computing system. The health of such other components may be described as for example and not limitation, a measure of the efficiency or a number of errors included in, or produced by such a component, among other measures of health.

The data elements are monitored via a second computing system for an occurrence of an alert condition, as indicated at 404. An alert condition, as described above, is defined by an administrator and is indicated by a value of a data element, a set of data elements, a trend in the data elements, or another feature exhibited by one or more data elements. In an embodiment, the data elements are monitored by a master controller as described above.

At 406, an alert condition is identified based on the data elements. A resolution process to resolve an issue causing the data elements to exhibit the alert condition is identified, as indicated at 408. In an embodiment, the resolution process is indicated in a configuration file for the alert condition along with other configuration information for the alert condition. The resolution process is then performed to resolve an issue causing the alert condition, as indicated at 410. As described previously, the identification of the alert condition, the resolution process, and the performance of the resolution process may be provided by the second computing system via a master controller.

In an embodiment, the resolution process includes a decision tree having a plurality of processes to be performed to resolve the issue. The decision tree may be structured to cause the process most likely to solve a given issue to be performed first and other processes having a lower probability of success performed subsequently. In embodiments, any arrangements of the process may be employed. Further, the performance of a process following the decision tree may be followed by a system check or collection of one or more data elements to determine if the process was successful in resolving the issue. If the process was successful, the decision tree informs the resolution process to terminate, provide a notification to an administrator, and/or to complete additional processes.

If the process was unsuccessful, the resolution process on the next level of the decision tree is completed. Where the decision tree is exhausted and the issue is still not resolved a notification may be provided and displayed to an administrator to indicate the issue, the processes or decision tree used to attempt to resolve the issue, and any other available or desirable details. The administrator identifies a process or processes that will resolve the issue and implements the process(s) to resolve the issue. Upon identifying appropriate process(s) to resolve the issue, the administrator may also input and add the identified process(s) to the decision tree or create a new decision tree such that when the issue again occurs the issue may be resolved automatically without administrator intervention. The additions to the decision tree or the new decision tree are implemented during runtime without otherwise affecting the monitoring and healing processes.

Figure 5:
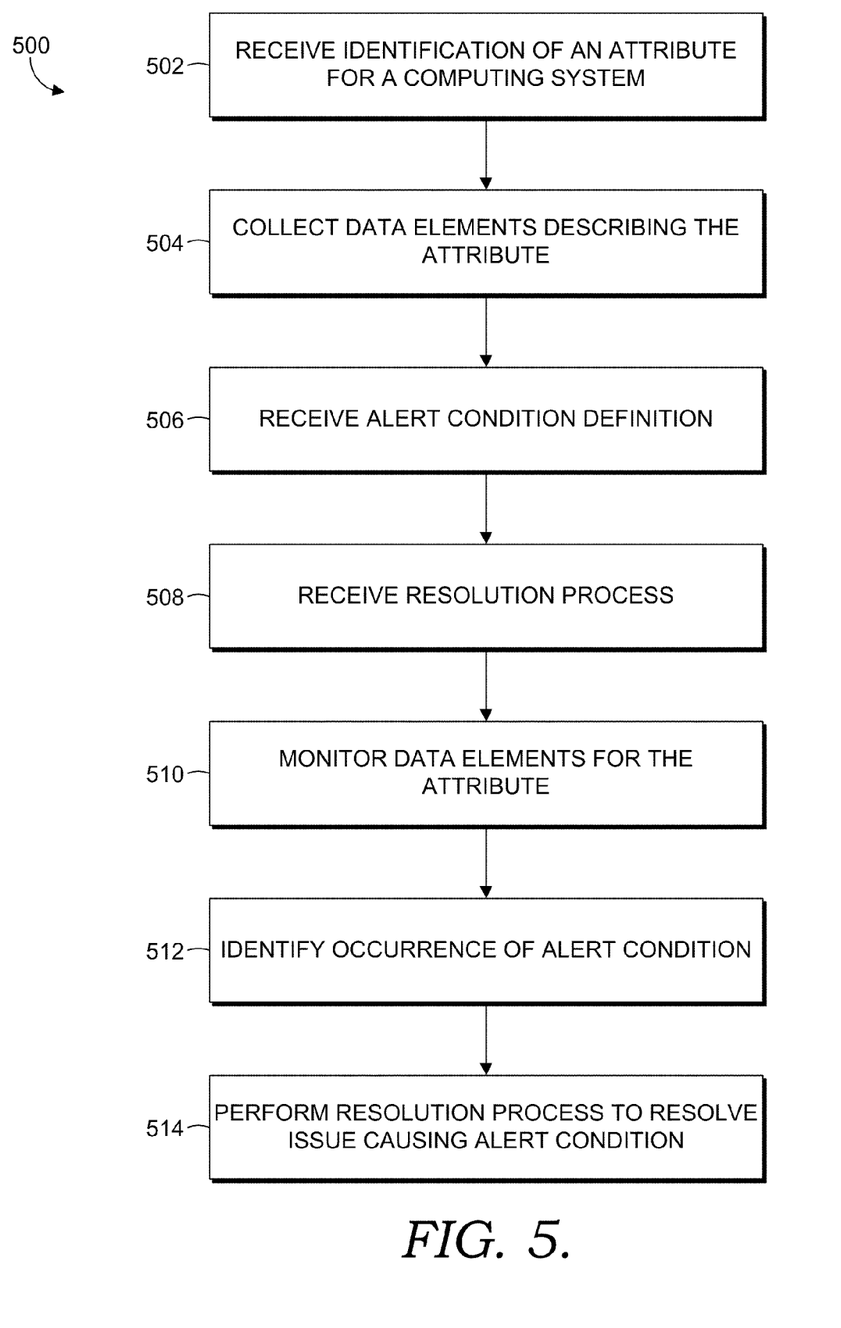
FIG. 5 is a flow diagram depicting a method for monitoring and healing a server computing system in accordance with an embodiment of the invention.

Referring now to FIG. 5, a flow diagram depicting a method for monitoring and healing a server computing system in accordance with an embodiment of the invention is described. Initially, an identification of performance counter and non-performance counter data of a first computing device is received, as indicated at 502. The performance counter and non-performance counter data includes any performance counter and non-performance counter data for the first computing device for which recordable data elements can be collected. The data elements describing the performance counter and non-performance counter data are useable by a monitoring system, such as a master controller, to identify the health of the first computing device. At 504, data elements for the performance counter and non-performance counter data are collected by a second computing device.

An alert condition definition and a resolution process are received, as indicated at 506 and 508 respectively. The alert condition definition describes a data element, a group of data elements, a trend in data elements, or another feature of the data elements that, when present indicates deteriorating health of the first computing system. The deterioration may include possible future deterioration as well as current and past deterioration of the first computing device's health. The resolution process includes any process or processes useable by the second computing device to resolve issues causing the deterioration in the health of the first computing device indicated by the alert condition. The resolution process includes a decision tree by which the second computing system carries out the resolution process to heal the first computing system. Further, the alert condition and the resolution process are provided via one or more configuration files stored in a configuration database, and the configuration file providing the alert condition provides an indication of the appropriate resolution process to be performed when an occurrence of the alert condition is identified.

At 510, the data elements collected for the performance counter and non-performance counter data are monitored for the occurrence of the alert condition. In an embodiment, the collected data elements are aggregated such that only the most relevant data elements are monitored for the alert condition. For example, the data elements are aggregated to retain only those data elements collected in the most recent five minutes. Thus, only the most recent five minutes of data are monitored for the alert condition.

An occurrence of the data element, group of data elements, trend in the data elements, or other features of the data elements indicating the alert condition is identified, as indicated at 512. The resolution process indicated to be performed for the alert condition is obtained and performed to resolve the issues or issues causing the alert condition and the deteriorating health of the first computing system, as indicated at 514.

If the resolution process is unable to resolve the issue an administrator is notified. The administrator can then identify one or more processes or changes to the current processes that will resolve the issue. The administrator adds the additional process(es) to the resolution process decision tree, creates a new decision tree, or changes the current processes of the resolution process such that the resolution process is able to automatically resolve the issue when it occurs again. The administrator may also redefine the alert condition and/or the data elements to be collected to better accommodate the issue. The administrator's changes are then provided to the configuration database during runtime and are incorporated without otherwise affecting the ongoing monitoring and healing processes.

In addition, by collecting and monitoring non-performance counter data as well as performance counter data, alert conditions can indicate deteriorating health of a single computing device or deteriorating health between two or more computing devices. For example, where a first and second computing device are having a communication issue between the two, the performance counter data for both the first and second computing devices may indicate that both computing devices are healthy. However, by collecting non-performance counter data such as ping and status data a deterioration in the health of the communication between the two computing devices is identified. Thus, the issue can be resolved or an administrator notified thereof.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for monitoring a computing system, the system comprising one or more computing devices having a processor and a memory and configured to provide the following components:

a monitoring agent that utilizes a first computer process to collect one or more non-performance-counter data elements from a first computing device, the non-performance counter data elements being indicative of the health of a computing system;
a performance database that stores the one or more non-performance-counter data elements from the first computing device;
a configuration database that stores instructions that are executable by a second computing process to resolve an alert condition, the alert condition arising when the one or more non-performance-counter data elements exhibit a predefined characteristic that indicates a degradation in the health of the computing system; and
a master controller that resolves the alert condition, via the second computer process, by a) monitoring one or more of the non-performance-counter data elements stored in the performance database to identify an occurrence of the alert condition, b) obtaining the instructions from the configuration database to resolve an identified alert condition, and c) automatically executing the instructions to resolve the identified alert condition,
wherein the first and second computer processes are performed by one or more of the computing devices.

2. The system of claim 1, wherein the monitoring agent is deployed on the monitored computing device and the master controller utilizes a second computing device to perform the second computing process.

3. The system of claim 1, wherein the monitoring agent is deployed on a third computing system and monitors the monitored computing system and the master controller operates from the second computing system in communication with the third computing system and the monitored computing system.

4. The system of claim 1, wherein an administrator identifies the one or more non-performance-counter data elements to be collected by the monitoring agent and identifies one or more of the predefined characteristics of the one or more non-performance-counter data elements that indicate the existence of the alert condition.

5. The system of claim 1, wherein the non-performance-counter data elements include one or more of a service status, a database query, and a ping.

6. The system of claim 1 wherein the monitoring agent also collects one or more performance-counter data elements.

7. The system of claim 1 wherein the instructions, when executed, cause the master controller to execute one or more of restarting a service, restarting the monitored computing system, running additional services, running script, querying a database, querying an application, moving operations of the monitored computing system to a second monitored computing system, and shutting down the monitored computing system.

8. The system of claim 1 wherein the master controller provides a notification to an administrator that the alert condition has occurred.

9. The system of claim 1 wherein one or more redundant failover master controllers are available to assume duties of the master controller when the master controller is rendered at least partially inoperable.

10. The system of claim 1 wherein changes are made to the one or more non-performance-counter data elements and the instructions, and wherein the changes are incorporated by the monitoring agent and the master controller during runtime of the monitored computing system.

11. The system of claim 10, wherein the changes are communicated to the monitoring agent and the master controller as an extensible markup language (XML) file.

12. Computer-readable media having computer-executable instructions embodied thereon that, when executed, perform a of method for monitoring and healing a computing system, the method comprising:
collecting one or more non-performance-counter data elements from a first computing system, the one or more non-performance-counter data elements being indicative of the health of the first computing system;
monitoring the one or more non-performance-counter data elements via a second computing system for an alert condition, the alert condition being a pre-defined status of the first computing system that is indicated by the one or more non-performance-counter data elements;
identifying, automatically by the second computing device, an occurrence of the alert condition based on the one or more non-performance-counter data elements;
identifying a resolution process that includes a decision tree to be performed by the second computing system to resolve the alert condition; and
performing, by the second computing system, the resolution process to resolve the alert condition without administrator interaction, the second computing system including a computing device having a processor and a memory.

13. The media of claim 12, wherein the health of the first computing system includes the health of one or more of a database, an application, a memory, a software component, and a hardware component on the first computing system.

14. The media of claim 12, wherein the resolution process is pre-defined by an administrator and includes one or more of restarting a service, restarting the monitored computing system, running additional services, running script, querying a database, querying an application, moving operations of the monitored computing system to a second monitored computing system, and shutting down the monitored computing system.

15. The media of claim 12, further comprising;
receiving a change to the resolution process;
implementing the change during runtime of the first computing system.

16. The media of claim 12, wherein the one or more non-performance-counter data elements are chosen by an administrator from a group of all recordable information for the first computing system.

17. The media of claim 12, further comprising:
aggregating a plurality the one or more non-performance-counter data elements to provide a set of aggregated data that includes the most relevant of the one or more non-performance-counter data elements to be monitored for the alert condition;
monitoring the set of aggregated data for the alert condition.

18. A computer-implemented method for automatically monitoring a server computing system, the method comprising:
receiving an identification of one or more performance-counter and non-performance-counter data elements of a first computing device indicative of the health of a computing system, wherein the non-performance-counter data elements include one or more of a status, a query, and a ping;
collecting the one or more performance-counter and non-performance-counter data elements from the first computing device via a second computing device, the second computing device having a processor and a memory;
receiving an alert condition definition that identifies a data element or group of data elements of the one or more performance-counter and non-performance-counter data elements indicative of deteriorating health of a computing system;

receiving a resolution process that is executable by the second computing device to resolve an alert condition, the resolution process including a decision tree that is followed by the second computing device to execute the resolution process;

monitoring, by the second computing device, the one or more performance-counter and non-performance-counter data elements collected from the first computing device based on the alert condition definition;

identifying, by the second computing device, deteriorating health of the computing system based on the alert condition definition;

executing, by the second computing device, the resolution process to resolve the issue that is a cause of the deteriorating health of the computing system, the resolution process being unable to resolve the issue; and adding one or more additional processes to the resolution process during runtime; or changing one or more processes of the resolution process during runtime, such that the resolution process is useable by the second computing device to automatically resolve subsequent occurrences of the issue without administrator interaction.

* * * * *